United States Patent [19]

Passmore et al.

[11] Patent Number: 4,800,538

[45] Date of Patent: Jan. 24, 1989

[54] METHOD OF AND SYSTEMS FOR SEISMIC EXPLORATION

[75] Inventors: Paul R. Passmore, Dallas; William A. Nance, Carrollton, both of Tex.

[73] Assignee: Refraction Technology, Inc., Dallas, Tex.

[21] Appl. No.: 846,583

[22] Filed: Mar. 31, 1986

[51] Int. Cl.[4] .............................................. G01V 1/22
[52] U.S. Cl. ........................................ 367/55; 367/76; 181/111
[58] Field of Search ....................... 367/41, 55, 76, 77, 367/78; 181/114, 121, 111

[56] References Cited

U.S. PATENT DOCUMENTS

| | | | |
|---|---|---|---|
| 3,221,305 | 11/1965 | Delloue | 367/77 X |
| 3,277,977 | 10/1966 | Silverman | 181/114 X |
| 3,412,823 | 11/1968 | Bell | 367/55 |
| 3,465,286 | 9/1969 | Stone | 367/55 X |
| 3,891,963 | 6/1975 | Herbert, Jr. | 367/55 |
| 3,900,825 | 8/1975 | Hinnant | 367/77 |
| 4,042,906 | 8/1977 | Ezell | 367/77 |
| 4,583,206 | 4/1986 | Rialan et al. | 367/77 X |

Primary Examiner—Thomas H. Tarcza
Assistant Examiner—Tod R. Swann
Attorney, Agent, or Firm—Kanz, Scherback & Timmons

[57] ABSTRACT

Described are methods of and systems for seismic exploration wherein a master station and a plurality of slave stations are utilized in conjunction with remotely located seismic sources. The system includes apparatus at the master station for generating a start signal and transmitting that signal over single frequency radio link to each of the slave stations. Upon receipt of the start signal at the slave stations the seismic sources are energized in a preprogrammed mode. The field time-break and signature of the seismic energy is acquired and transmitted via the same radio link to the master station. The time-break of one of the sources is transmitted in real time and thereafter each slave station is polled or interrogated by the master station to transmit via the same radio link the time-break and amplitude data representative of the signature of each of the sources before the generation of the next start signal.

17 Claims, 6 Drawing Sheets

METHOD OF AND SYSTEMS FOR SEISMIC EXPLORATION

BACKGROUND OF THE INVENTION

1. Field of the Invention

This invention relates to methods of and apparatus for controlling and synchronizing the output of a multiplicity of seismic sources utilized in seismic exploration. The invention provides for maintaining shot-by-shot quality control at a control station and continuously verifies similarity.

2. Description of the Prior Art

Seismic sources can be characterized either as single point sources or multiple point sources. The single point source is a single source of acoustic energy, either a continuous wave source or an impulsive source. In land operations the single point source is typically fired utilizing a radio control system. A master unit receives a fire command to initiate a start command to a recording system. There is then transmitted by radio a synchronizing code to a slave unit located at the source. Once this is accomplished, the master stops transmitting and begins receiving. The slave unit begins transmitting a tone and fires the source. Upon the receipt of a time break signal, usually from a time break sensor, the tone frequency changes. The master unit decodes the tone change at the time the source applied energy to the earth's surface and applies a field time break signal to the recorder.

Problems arise in the case where multiple sources are utilized where it is intended either that all the sources apply energy simultaneously to the earth's surface, or in sequential fashion to produce plane waves with some desired directivity.

Assumptions have been made in utilizing land sources such as land airgun sources, that once the sources have been synchronized and calibrated, for example, at the initial stage of conducting operations in the day, that thereafter all sources will simultaneously apply energy to the earth's surface and the energy output waveform or signature will be constant. These assumptions have proven to be erroneous.

It has been recognized in the utilization of airguns in marine operations, that the firing time of the airguns will vary during the course of an operation during the day. In marine systems when the recording equipment is on the boat, compensation is readily achieved inasmuch as each airgun in an array and its related sensor are direct wired to the recording boat. An operator can observe the actual time of opening of a valve in each airgun and to make compensating changes in firing time as by introducing delays such that each airgun fires at the desired instant of time with respect to the other airguns in the array.

The marine technique is not applicable to land operations since it is impractical to direct wire each of the land sources to the recording truck. The communication between the recording truck or master station to the sources or slave stations is conducted by a radio link. Since but one frequency is available for data communication between the recording truck and the sources in conducting commercial seismic exploration, one can readily see that it is impossible to receive time breaks simultaneously from all the sources. Accordingly, it has been the practice to receive a time break but from one source and assume that, having initially synchronized the firing time of each of the airguns, that the application of energy from the guns to the earth will take place a predetermined instant following the transmission of a firing command. This assumption has led to the production of undesirable data inasmuch as the application of energy to the earth is not simultaneous, but there exist time delays giving rise to phase shifts in the applied signals which distort the waveform, and in some instances give rise to cancellation of energy applied to the earth.

In accordance with the present invention, the problems introduced by the prior art techniques are avoided. The system enables the production of data useful in the field. Waveforms of the input energy at each source, as well as the time occurrence of that energy, or the onset of that energy, for each shot are made available for the processing of the data.

SUMMARY OF THE INVENTION

In the practice of the present invention, a firing signal is transmitted from a master station to each of the slave units or stations at the sources. The sources respond to generate seismic energy and the time occurrence of the application of seismic energy, as well as the wave form of that energy, is then sequentially transmitted from each source back to the master station or recording truck. In one embodiment of the present invention, a slave station selected as a designated unit transmits the time break in real time to the recording truck. The time break and waveform data are recorded at all slave stations and following the real time transmission these data are sequentially transmitted back to the recording truck.

More particularly the system for seismic exploration includes a master station and a plurality of slave stations for use with a plurality of remotely located seismic sources. Means are provided at the master station for generating a start signal which is transmitted over a single frequency radio link to each of the slave stations. One of the slave stations is selected with its associated source as a designated unit. The start signal is received by means at each of the slave stations to activate their associate sources to generate seismic energy in a preprogrammed mode. Means at each slave station requires a time-break and amplitude of the seismic energy generated at each source. The field time-break data from the designated unit is transmitted via the radio link to the master station in real time and thereafter each of the slave stations is polled over the same radio link by the master station and transmit the field time-break and amplitude data representative of the signature of each of the sources.

In the preferred embodiment a different slave station and associated source is identified as the designated unit following each activation of the sources.

The method in accordance with the present invention comprises the steps of activating a plurality of seismic sources by transmitting a firing control signal over a single frequency radio link. Thereafter there is transmitted over the same radio link in real time to a master station a time break signal representative of the actual firing time of one of the sources. Each of the sources is then polled from the master station in sequence to receive signals representative of the time break and amplitude waveform of the energy from each of the sources. The steps are repeated with the selection of another source as a designated source for each repetition of firing.

DESCRIPTION OF THE PREFERRED EMBODIMENT

Figure 1:
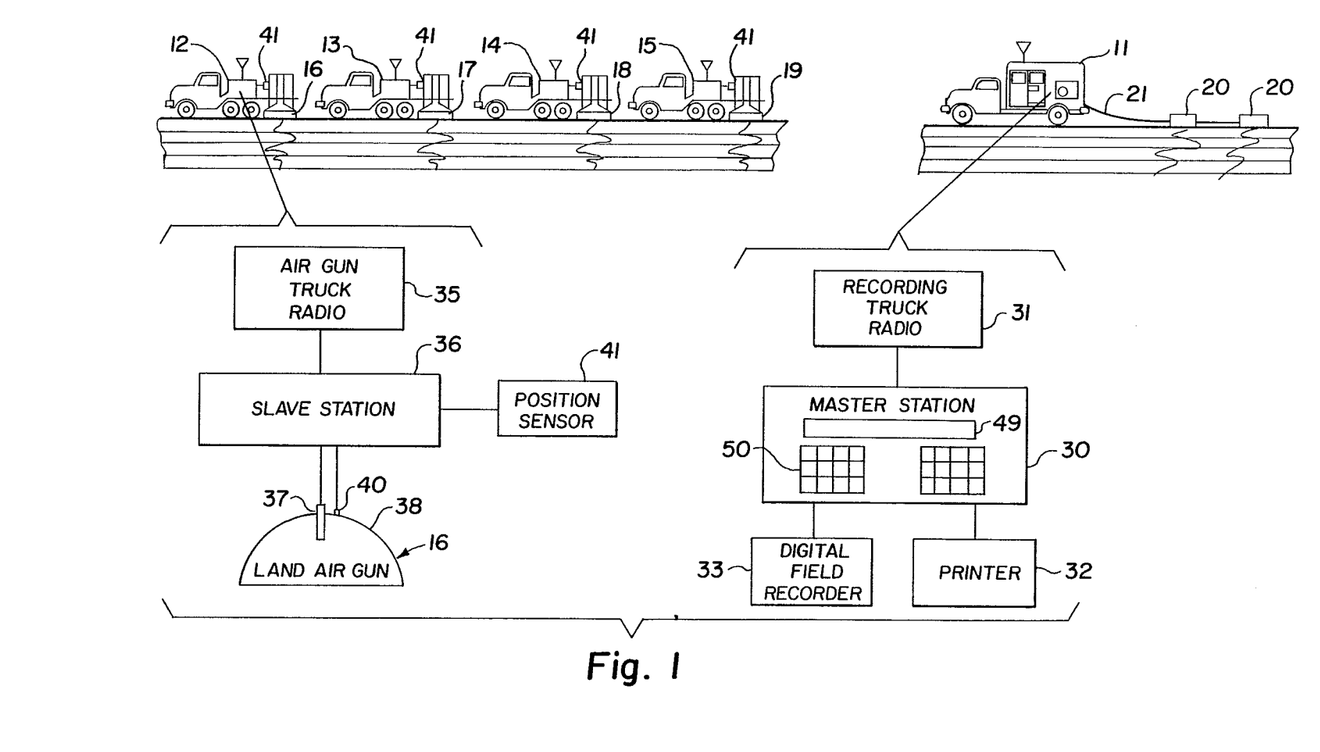
FIG. 1 is a block schematic of a system embodying the invention.

Referring now to the drawings and in particular to FIG. 1 there is shown in schematic form a seismic exploration system 10 embodying the present invention. The system 10 includes a recording truck 11 and a plurality of seismic source trucks 12, 13, 14 and 15. As many as eight source trucks may be employed in an exploration survey, however only four have been illustrated. Upon command from the recording truck 11 via a radio link the sources, here illustrated as land air guns 16, 17, 18 and 19 are fired under local control in a preprogrammed manner to generate acoustic energy which propagates through the earth. The propagating energy strikes anamolies in the earth's subsurface and is reflected back to the earth's surface to a series of geophone arrays 20, only two of which have been illustrated. The arrays 20 are shown in communication with the recording truck 11 by way of cable 21. The result is the production of a series of seismic traces useful in the interpretation of the subsurface of the earth.

As is well known, other data is necessary in order to render the seismic traces useful and that data is the field time-break or the time at which energy has been applied to the earth by the source trucks 12-15. Where only one source truck is utilized in conducting an exploration survey, there is little or no difficulty in acquiring the field time-break in real time by way of the radios linking the recording truck and the source truck. In as much the radio transmission of data is limited to a single frequency in conducting commercial seismic exploration it has been the practice of the prior art to utilize the field time-break from one of the source trucks. This utilization is based on the assumption that following calibration and testing of all the trucks before beginning the survey on a given day that the source trucks will continue to operate in the same manner throughout the course of the day. This is assumption has proven to be erroneous giving rise to significant errors in the quality of the data recorded. These errors are avoided by the utilization of the present invention through the provision of methods and systems which provide at the recording truck 11 a continuing observation by an experienced operator of the time-break and signature from each source for each shot despite the limitation of a single frequency radio communication link between the recording truck 11 and the source trucks 12-15. The recording truck 11 includes a master station 30 coupled to a truck radio 31 and connected to a printer 32 and a suitable digital field recorder 33. The digital field recorder may be of the type commercially available and knon as a DFS-V available from Texas Instruments Company of Dallas, Texas.

Each of the source trucks 12-15 includes a radio 35 connected with the slave station 36. Illustrated in FIG. 1 as a source is a land air gun 16. The land air gun is comprised of a high pressure air gun of the type available from Bolt Industries mounted in a chamber 38 filled with water. The chamber 38 is bell shaped, the bottom portion of which is comprised of flexible material resting in a pan co-terminous with the bottom of the bell. The high pressure air gun 37 is pressurized under control of the slave station 36 and when ready, the air gun is fired and the acoustic energy is transmitted through the water into the earth by way of the bottom portion of the chamber 38. The time of firing of the land air gun 16, that is the field time-break, is detected by a transducer 40 which also produces a signal representative of the waveform of the seismic energy known in the art as the signature. Each source station includes a position sensor 41 which generates a signal representative of the position of the air gun with respect to the surface of the earth. The guns are controlled from the master station 30 so as to be inhibited from firing until the position sensor 41 produces a signal indicative of the fact that the land air gun 16 is in engagement with the earth. Information from the position sensor 41 is also provided the truck operator to indicate that the gun has been disengaged from contact with the earth's surface and that it is now in position to be transported to another shot location.

All the slave stations at the sources 12-15 are under control of the master station 30 which generates a start signal transmitted by way of the radio 31 over a single frequency radio link to each of the slave stations 36 located in the source trucks 12-15. At this time one of the slave stations is selected with its associated source as a designated unit. The start signal is received at each of the slave stations 36 to activate their local logic to control the firing of their associated sources to generate seismic energy in a preprogrammed mode. Upon firing of each source the time-break and the signature are detected by the detector 40 and stored at each slave station 36. However, at the designated unit the time-break of its related source is transmitted to the master station 30 over the same radio link in real time. After receipt of the field time-break from the designated unit each source is interrogated from the master station and begin sequentially transmitting to the master station via the same radio link the recorded field time-break and the signature. These data are utilized at the master station to determine whether the firing of the sources produced seismic energy acceptable with respect to the time occurrence (the time-break) as well as the signature which represents the energy generated at each source. This information enables the operator at the master station to determine whether or to any shot or generation of seismic energy will produce acceptable seismic data when compared to predetermined criteria. If not, the master station will then cause the sources at the source trucks 12-15 to make corrections with regard to the time occurrence and or energy of the shots. Should the correction not be correctable, then either a substitute source truck may be utilized or the source truck may be removed from the exploration program until such time as repairs are made. In the alternative the poor data will be identified and not utilized in further processing.

Figure 2:
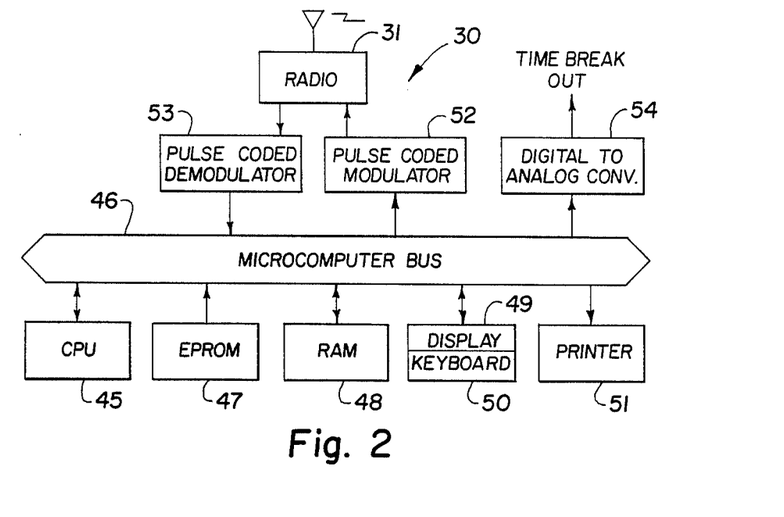
FIG. 2 is a block schematic of a master station.

Details of the master station 30 are illustrated in schematic form in FIG. 2. The master station or master controller includes a CPU 45, a micro-processor, which controls the flow of all information into and out of the master station 30 by way of a micro-computer bus 46. An EPROM 47 contains the software used to operate the master controller and a random access memory (RAM) 48 provides temporary storage for information to be transmitted, received and processed. Display 49 makes visually available to the operator information used to control the firing of the various sources and also sets forth the status information received from each source after each shot. Keyboard 50 is utilized to enter control information and to select the type of data to be displayed on the screen of display 49. Printer 51 provides a printed record of the firing information. Firing information is encoded by a pulse coded modulator 52 and transmitted by radio 31 to each of the plurality of slave stations. Information from the slave station is received by way of radio 31 decoded by pulse coded demodulator 53 and distributed in the master station by way of micro-computer buss 46. Digital to analog converter 54 changes the digital time-break to analog and the "time-break out" signal is then applied to the system recording equipment.

Figure 3:
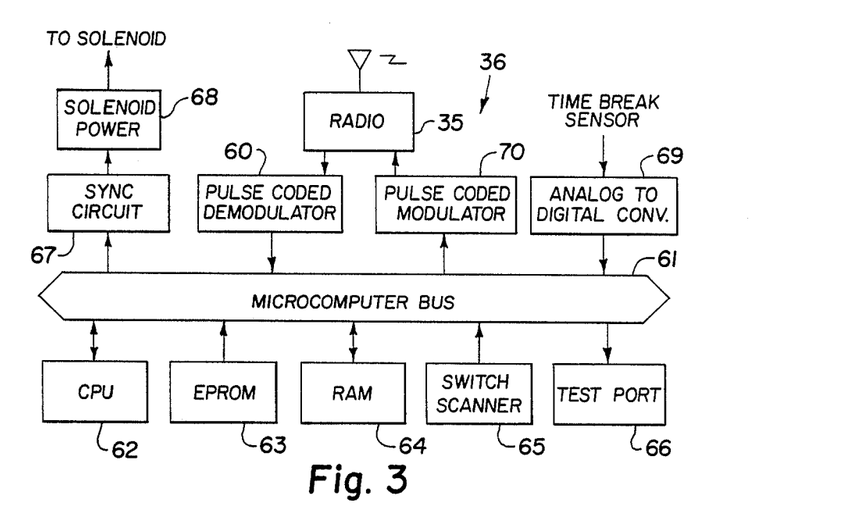
FIG. 3 is a block schematic of a typical slave or source station.

Details of slave station 36 are illustrated in block schematic form in FIG. 3. There the control signals from the master station are received via radio 35, decoded by pulse coded demodulator 60 and applied to micro-computer buss 61. CPU 62, a micro-processor controls the flow of all information into and out of the slave station 36 and the EPROM 63 contains all the software necessary to operate the slave station 36. A random access memory (RAM) 64 provides temporary storage for information being transmitted, received and processed at the slave station 36. The slave station front panel includes a number of switches, not shown, but including privacy codes, switches for identifying the number of the unit, that is whether it is source unit 1, 2, 3, 4, an arm/safe switch which enables and disables the slave units ability to fire the air gun, etc. The status of all these switches is applied to the CPU 62 by switch scanner 65. Test port 66 provides a sync signal and other signals to be used when the source unit, including the slave station 36, is undergoing testing. Sync circuit 67 receives a signal by way of the micro-computer buss 61 from CPU 62 and applies a control signal to solenoid power which in turn applies the power to an air gun solenoid and fires the gun. Analog-digital converter 69 converts the field time-break from analog-to-digital and the digitized time-break is then applied by way of micro computer bus 61, pulse coded modulator 70 and radio 35 to the master station.

Figure 6:
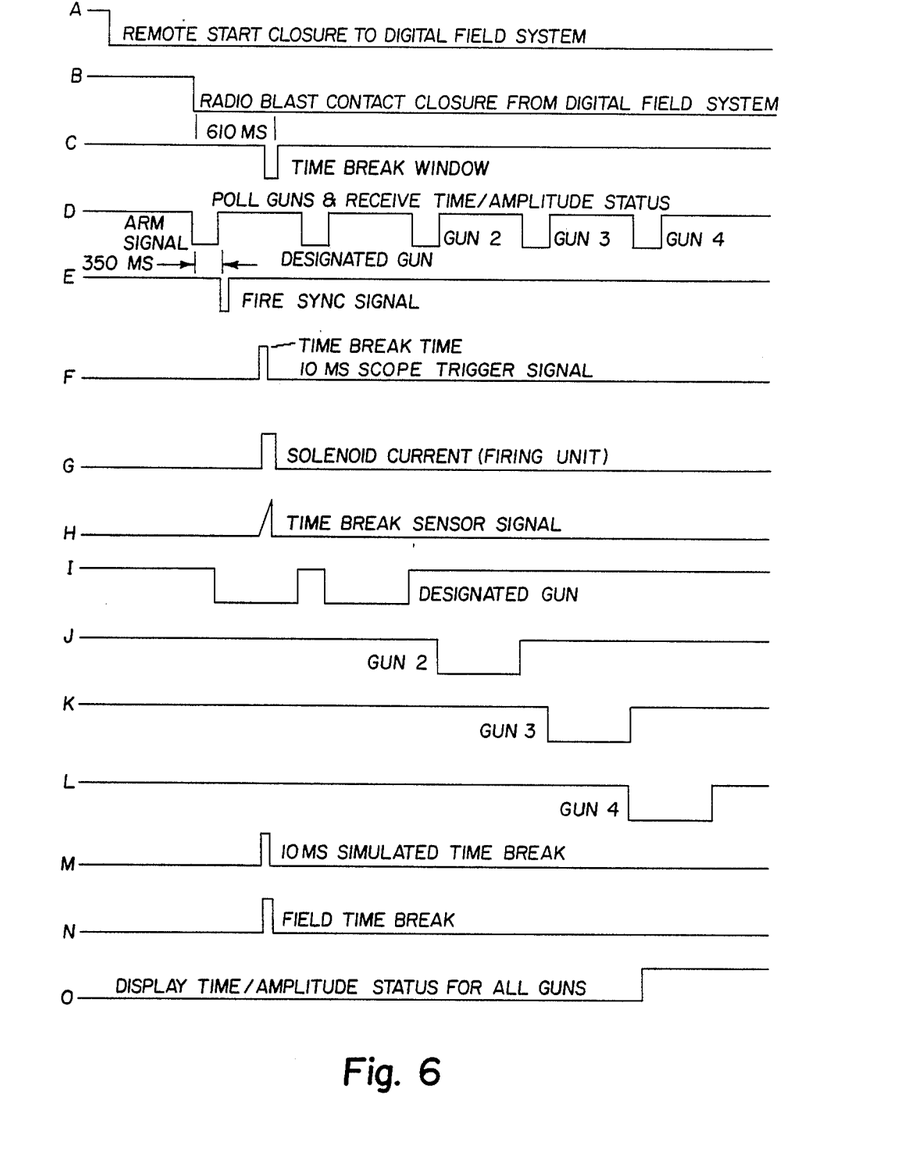
FIG. 6 is a time-waveform diagram helpful in the understanding of the present invention.

Operation of the system including the master station and the slave stations will be better understood by reference to a pulse timing diagram illustrated in FIG. 6. The operational sequence begins when the recording system 33, such as the DFS-V FIG. 1 receives a remote start closure, line A. This signal informs the recording system to initiate a recording sequence. In line 5 the recorder system sends a radio blast contact closure to the master station at which time the master station begins to send an arm signal, line D, via radio 31 to all the slave stations 36 located in the source units 14–15. On receipt of the arm signal all the slave stations ready their internal firing programs. At this time one slave station together with its related gun is designated by the master station as a designated unit to transmit its field time-break in real time to the master station. At the end of the arm signal, line D, the master station sends a fire sync signal, line E, to all the slave stations who then begin their internal firing programs. The master station now goes into a receipt mode to receive the field time-break in real time from the designated unit.

Based upon their pre-programmed time-breaks, the slave stations calculate the firing time delays and at the correct moment each slave station applies a signal via the sync circuit 67 which by way of solenoid power 68 causes its related air gun to be fired. (Line G) Just prior to the solenoid current being applied, the field recorder opens its time-break window, line C. The time-break window may be approximately 120 millisecond long. During the duration of the window the recording system must receive a time-break. To satisfy this need, the master station sends a simulated time-break, line M to the recording system at the aiming point. The aiming point is that point in time when the air guns are to send their energy into the earth, ideally at the center of the time-break window, line C. When the recording system 33 receives the simulated time-break it begins its recording cycle. When the designated unit fires it produces the field time-break, lines H and N, transmitted in real time to the master station and this real time-break is then applied to the recording system 33 and utilized as the shot point seismometer input to the field recording system 33.

The real time break is the moment when the airgun or source makes its greatest impact with the earth. When an airgun is accurately timed its real time-break occurs in the middle of the time-break window as shown in line H relative to the time-break window line C.

The time-break information at each slave unit 36 is recorded as well as the waveform of the energy generated by its related source. This includes the designated unit. After the units have been fired the master control or station begins to poll each gun for its field time-break and amplitude information. In line 4 when the timing line is low the master station is polling the slave stations. When the timing line is high the master station is receiving information from the slave station. In lines I, J, K and L when the timing line is high the slave stations are receiving information from the master station. When the timing line is low the slave stations are transmitting data to the master station. Following receipt of all firing data from the slave stations there is displayed at the master station the time/amplitude status for all the guns line O.

Prior to the next sequence the master station now selects another slave station and its related source as a designated unit. This selection continues following each firing sequence such that each slave station and its related gun in effect takes turns being identified as a designated unit to send its field time-break to the master station in real time.

Figure 4:
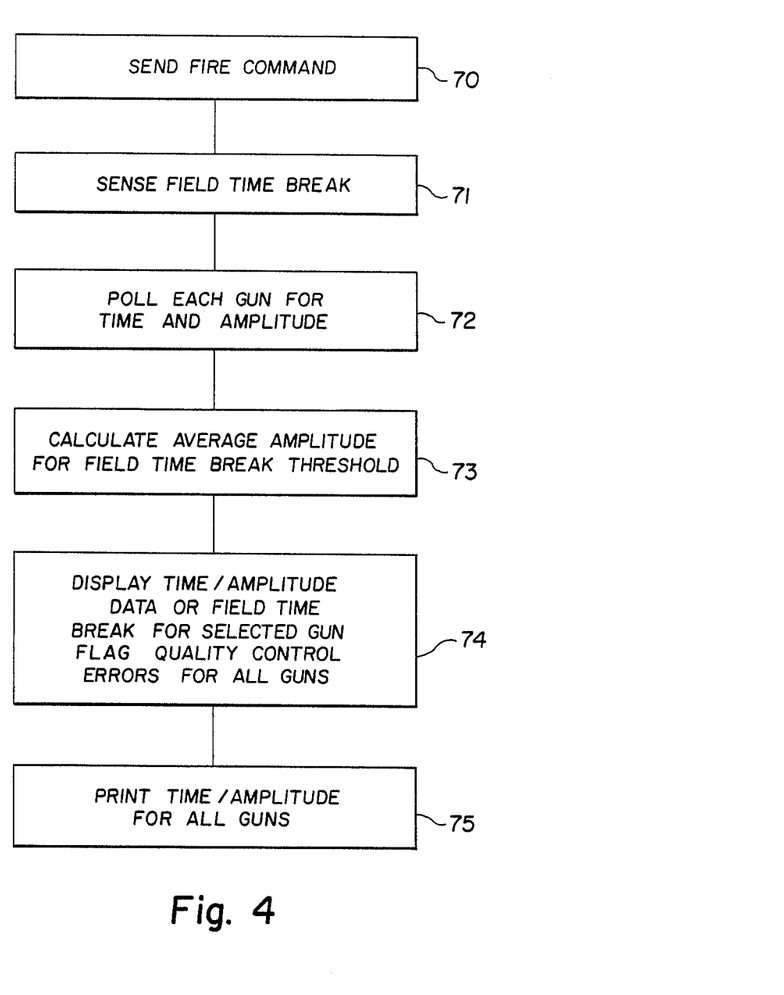
FIG. 4 is a logic flow diagram depicting the mode of acquiring data.
Figure 5:
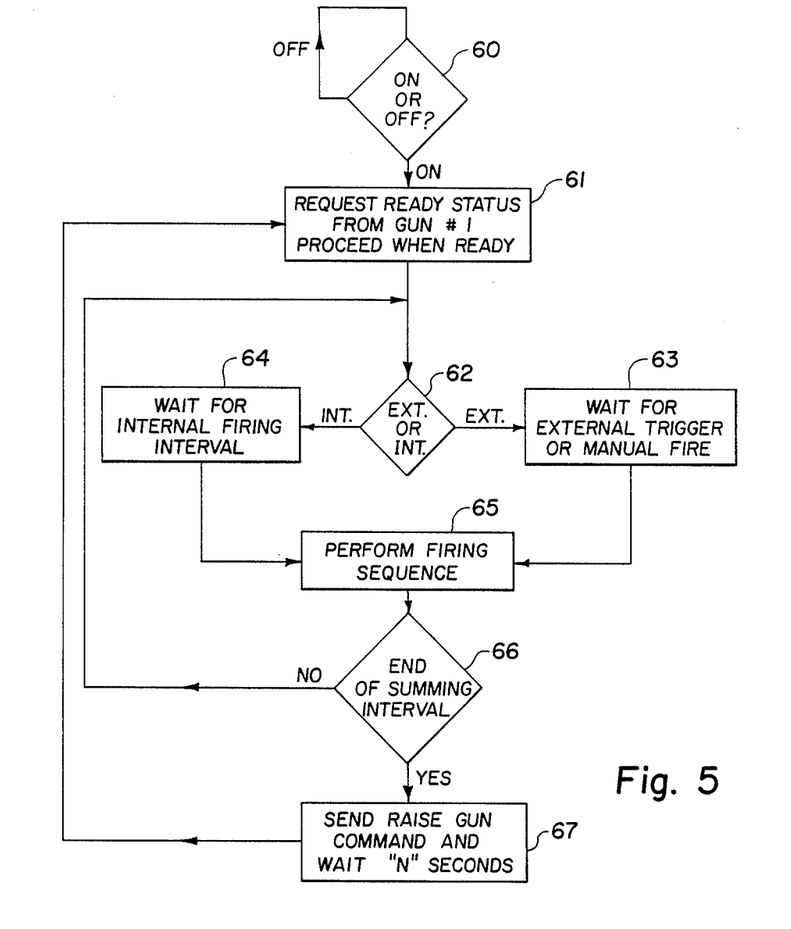
FIG. 5 is a logic flow diagram depicting the mode of gun firing.

The operation of the system is also illustrated by logic flow diagrams of FIGS. 4 and 5. In FIG. 5 the status of the system whether ON or OFF is made in decision block 60. If on, block 61 requests the ready status from gun number 1. A ready status report will issue from number 1 when the gun has been lowered to the surface of the earth and the air gun properly charged with compressed air. In field operations the guns are numbered 1, 2, 3, etc. Gun number 1 is the last gun to be lowered to the earth and its ready status will indicate all guns are ready. In decision block 62 the determination is made whether to utilize external or internal firing. If external, a manual fire or some other signal generator external to the system will be utilized to generate a firing command. If internal, block 64 waits for the internal firing interval or command to be issued under control of the field recorder and the master station. In block 65 the firing sequence is performed and in block 66 the determination is made as to whether or not that particular firing constitutes the end of a summing interval. In typical operations, the sources or guns are fired a predetermined number of times at each shot point with the resultant seismic data being composited or summed in order to enhance the signal-to-noise ratio of the signal. In the event that the summing interval has not been completed the program returns to decision block 62 and the firing sequence is again performed until such time as the last shot in the summing interval is performed. When the latter occurs a signal will be sent by block 67 to raise the gun and wait N seconds. The program then returns to block 61 for a repeat of firing sequence. In the interval between the raising of the guns and the commencement of the next firing sequence, the guns will be moved over to an adjacent shot point.

The firing sequence of block 65, FIG. 5, is illustrated in logic flow diagram of FIG. 4 where block 70 sends the firing command and in block 71 there is sensed the field time-break at each of the slave stations. Following the firing, each gun or slave station is polled in block 72 for time and amplitude of the input energy. The polled data is then utilized in the calculation of the average amplitude for the field time-break threshold in block 73. This information is useful in providing a composite signal where waveform processing of the seismic data is utilized. In block 74 there is displayed the time/amplitude data or field time-break for the selected or designated gun. An examination of the data enables the operator to flag the quality control errors for all guns and determine whether or not the received seismic data is useful or should be discarded because the guns failed to fire on time or failed to produce the minimum energy as required for valid data. Thereafter in block 75 there is printed the time/amplitude data for all guns.

The present invention provides methods and systems for assuring on a shot to shot basis that the sources are performing according to predetermined parameters and thus provides a similarities test from shot to shot for each source as well as a comparison of how the sources are performing relative to one another.

The invention is also applicable to the generation of vertical seismic profiles. A vertical seismic profile or VSP operation is illustrated schematically in FIG. 7. VSP is a procedure which has gained favor over the last several years in the exploration industry because of its utility in defining subsurface earth formations traversed by a well-bore and in fact, obtaining sub-surface information below the well-bore.

Figure 7:
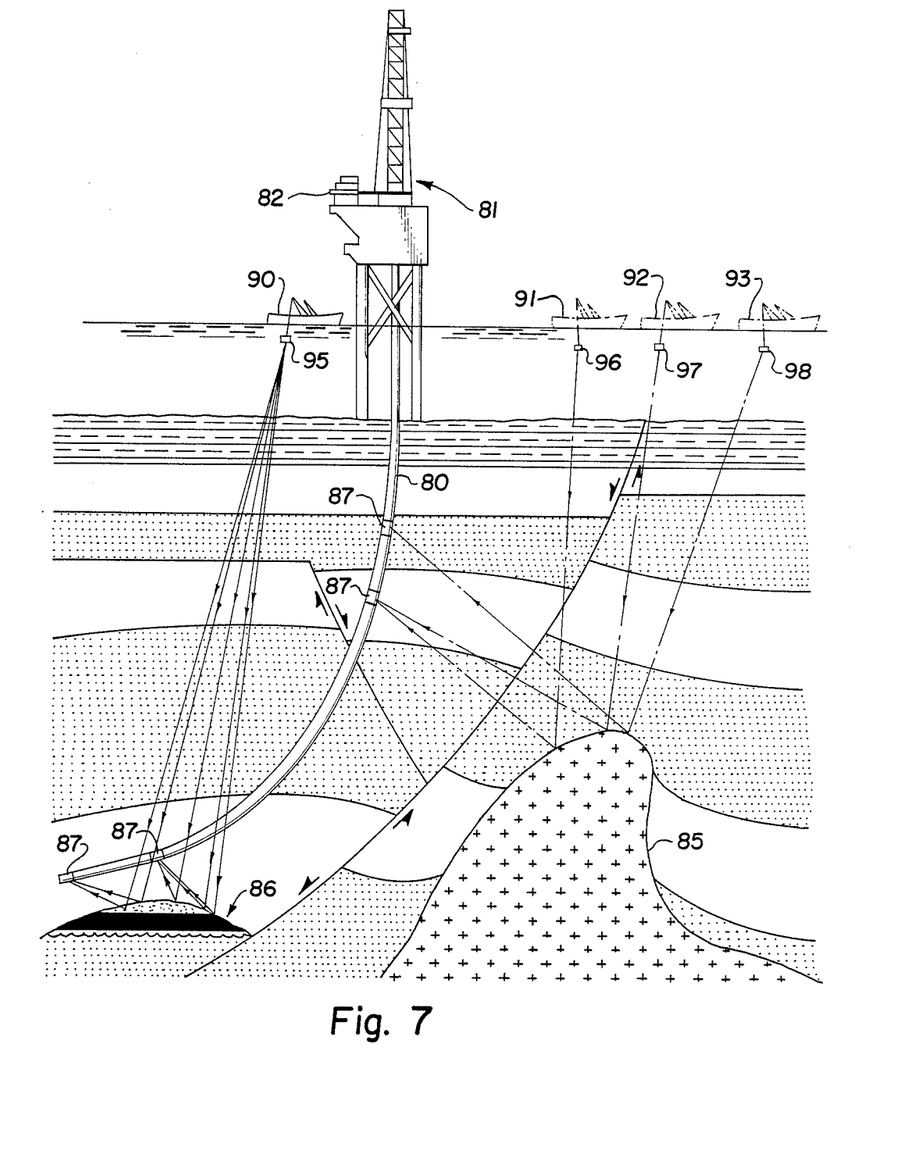
FIG. 7 schematically illustrates the application of the invention to Vertical Seismic Profiling (VSP).

While VSP is applicable both in land and marine operations, an application of the present invention is illustrated in conjunction with a marine operation. In such an operation a well-bore 80 is being drilled from a marine platform 81 on which is located a master station 82. The well-bore 80 is shown traversing faulted earth sub-surfaces and by-passing a salt dome 85 and an illustrated hydrocarbon reservoir 86. The VSP procedure enables the acquisition of data which will delineate the salt dome and also assist in identifying the reservoir 86. In carrying out the procedure a series of geophones 87 are mounted within the well-bore Typically clamped geophones 87 are utilized to detect seismic energy being reflected off the salt dome 85 and the reservoir 86. The invention is particularly applicable to the conduct of multiple offset VSP where boats 90–93 carry a seismic source or sources 95–98 and have on board a slave station associated with the source. To enhance the acquired data the guns 95–98 usually consist an array of air guns towed by the boats 90–93. All the air guns are direct wired back to the recording equipment on the boat and the field time-break and the character of the energy or waveform produced by the sources is detected by near field hydrophones (not shown). Near field hydrophones can be associated preferably with each of the arrays. Where the boats are close together the operation is much the same as that previously described with respect to FIG. 1 in that the master controller issues a firing command and the on board slave station then computes the proper firing times and fires the source or sources 95–98. The time-break of one of the sources, a designated source, is immediately transmitted to the master station 82 and the time-break and signatures of the other sources are then stored until such time as the master station as above described polls the various sources.

In conducting the operation the boats 90–93 move to different points spaced from the platform 81. As illustrated the boat 90 is moving toward the platform, and boats 91–93 are moving it to points beyond away from the platform. The application of the invention to VSP exploration enables the operator on the platform immediately to determine the quality of each shot with respect to time-break and signature and thus permits the evaluation as to the quality of the energy being generated by the sources 91.

In an alternative operation where the boats are more widely separated the sources 95–98 will be fired alternately with the source to be fired being identified as a designated source.

While four boats have been illustrated in FIG. 7 it will be appreciated that two boats may be utilized spaced one from the other, along parallel paths that pass on opposite sides of the platform 81 in the acquisition of 3-D seismic data. In that case each boat will carry a slave station under control of and to be interrogated by the master station 82 on board the platform 81. In this operation the sources will be alternately fired with the fired source being identified as the designated source.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claims, including the full range of equipmency to which each element or step thereof is entitled.

What is claimed is:

1. A system for seismic exploration including a master station and a plurality of slave stations for use with a plurality of remotely located seismic sources comprising:

means at said master station for generating a start signal, means for transmitting over a single frequency radio link said start signal to each of said slave stations, one of which is selected with its associated source as a designated unit,
   means for receiving said start signal at each of said slave stations to activate their associated sources to generate seismic energy in a preprogrammed mode, means at each slave station for acquiring the time break and amplitude of the seismic energy generated at each source, means for transmitting via the radio link to the master station in real time the time break data of the source at said designated unit, and means at each slave station for sequentially transmitting to said master station via the same radio link prior to the generation of the next start signal the amplitude data representative of the signature of each of the sources.

2. The system of claim 1 in which said means for sequentially transmitting amplitude data of each source also transmits the time break of each source.

3. The system of claim 1 including means for selecting a different slave station and associated source as said designated unit following each activation of said sources.

4. The system of claim 1 in which each source is a land air-gun.

5. The system of claim 1 in which each source is a marine source.

6. The system of claim 4 including means for inhibiting the firing of the air-guns until the guns are in contact with the earth.

7. The system of claim 2 including means at said master station for displaying and recording said time-break and amplitude data from each source.

8. A method of seismic exploration comprising the steps of:

activating a plurality of seismic sources by transmitting over a single frequency radio link a firing control signal, transmitting over the same radio link in real time to a master station a time-break signal representative of the actual firing time of one of said sources, polling from the master station in sequence each of said sources to receive signals representative of the time-break and amplitude waveform of the energy from each of said sources prior to the transmission of the next firing control signal, and thereafter repeating the above steps with the selection of another source for transmission of its time-break in real time for each repetition.

9. The method of claim 8 in which the sources are land air guns and the firing of the guns is inhibited until all guns are in contact with the earth surface.

10. The method of claim 9 in which said guns are raised from the earth's surface and moved to a second location following the last of said repetitive steps.

11. The method of claim 8 in which detectors of seismic energy are positioned in a well bore and said sources are moved to different sites relative to the well bore following completion of each repetition.

12. The method of claim 11 in which the master station is located on a marine structure and marine seismic sources are moved relative to said structure, activating the sources during movement to produce a multiple off set vertical seismic profile.

13. The method of claim 8 including the step of summing said amplitude waveforms from said sources following each repetition to provide a composite waveform.

14. A method of operating a plurality of remotely located seismic sources comprising:

generating at a master station a start signal, transmitting over a radio link said start signal to each of said sources, one of which is identified as a designated source, receiving said start signal at each of said sources and activating said sources to generate seismic energy in preprogrammed mode, acquiring at each source a signal representative of the time break of said seismic energy, transmitting via radio to the master station in real time the time-break of the designated source, and thereafter sequentially transmitting to the master station via the same radio link the time break data acquired at each of the other sources prior to the generation of the next start signal.

15. The method of claim 1 in which, after each generation of seismic energy, another one of said sources is identified as the designated source.

16. The method of claim 14 in which a reference amplitude is established at the master station for the output of said sources, acquiring amplitude data at each source, comparing the acquired amplitude data with said reference amplitude to determine the performance of each source for each generation of seismic energy.

17. The method of claim 14 in which a reference time-break is generated at the master station in response to said start signal and the acquired time-break data is compared with said reference time-break to determine the relative time of generation of seismic energy at each of the sources.

* * * * *

UNITED STATES PATENT AND TRADEMARK OFFICE
CERTIFICATE OF CORRECTION

PATENT NO. : 4,800,538
DATED : January 24, 1989
INVENTOR(S) : Paul R. Passmore; William A. Nance It is certified that error appears in the above-identified patent and that said Letters Patent is hereby corrected as shown below:

In Column 4, Line 1 change "knon" to "known

In Column 6, Line 31 insert --time-- after real

In Column 7, Line 67 place period (.) after well-bore.

In Column 10, Line 33 change 1 to 14

Signed and Sealed this

Thirteenth Day of June, 1989

Attest:

DONALD J. QUIGG

Attesting Officer

Commissioner of Patents and Trademarks